(12) United States Patent
Yama et al.

(10) Patent No.: US 7,758,027 B2
(45) Date of Patent: Jul. 20, 2010

(54) VIBRATION DAMPER

(75) Inventors: Kazuhisa Yama, Ayase (JP); Tsutomu Itou, Horwich (GB)

(73) Assignee: Hitachi, Ltd., Tokyo (JP)

( * ) Notice: Subject to any disclaimer, the term of this patent is extended or adjusted under 35 U.S.C. 154(b) by 444 days.

(21) Appl. No.: 11/723,628

(22) Filed: Mar. 21, 2007

(65) Prior Publication Data
US 2007/0252314 A1 Nov. 1, 2007

(30) Foreign Application Priority Data

Apr. 28, 2006 (JP) ............................. 2006-126112
Sep. 29, 2006 (JP) ............................. 2006-268742

(51) Int. Cl.
*B60G 11/52* (2006.01)
(52) U.S. Cl. .................... 267/33; 267/140.11; 267/134; 267/196; 267/293; 188/380
(58) Field of Classification Search ............ 267/140.11, 267/140.12, 140.13, 136, 140.4, 141, 292, 267/293, 134, 196, 33; 248/560, 562, 636, 248/638; 188/378, 379, 380
See application file for complete search history.

(56) References Cited

U.S. PATENT DOCUMENTS

| 2,205,586 | A | * | 6/1940 | Williams | 267/4 |
|---|---|---|---|---|---|
| 2,270,335 | A | * | 1/1942 | Parkinson et al. | 267/140.2 |
| 2,356,962 | A | * | 8/1944 | Williams | 267/3 |
| 2,634,069 | A | * | 4/1953 | Drake et al. | 248/583 |
| 2,906,523 | A | * | 9/1959 | Painter | 267/134 |
| 3,198,324 | A | * | 8/1965 | Kallenbach et al. | 206/320 |
| 4,984,777 | A | * | 1/1991 | Kurr et al. | 267/140.13 |
| 5,820,114 | A | * | 10/1998 | Tsai | 267/202 |
| 6,247,687 | B1 | * | 6/2001 | Jensen et al. | 267/200 |
| 6,752,389 | B2 | * | 6/2004 | Halladay et al. | 267/140.12 |
| 2006/0202400 | A1 | * | 9/2006 | Fitzgerald | 267/293 |

* cited by examiner

*Primary Examiner*—Robert A Siconolfi
*Assistant Examiner*—Mariano Sy
(74) *Attorney, Agent, or Firm*—Wenderoth, Lind & Ponack, L.L.P.

(57) ABSTRACT

An upper bush is secured to a bracket of a compressor unit, and a lower bush is abutted against a panel member of a vehicle body through a washer. A coil spring is interposed between the upper and lower bushes. A pipe member is inserted through the upper and lower bushes and the coil spring. A bolt is inserted through the pipe member and screwed into the panel member of the vehicle body. The compressor unit is resiliently supported floatingly by the coil spring. Vibration of the compressor unit is damped by friction generated by sliding contact between the pipe member and raised portions of the upper bush. When the vibration amplitude is large, respective projections of the upper and lower bushes abut against each other to suppress the vibration while absorbing impact.

17 Claims, 5 Drawing Sheets

VIBRATION DAMPER

BACKGROUND OF THE INVENTION

1. Technical Field

The present invention relates to a vibration damper, isolator or absorber for use in an automotive air-suspension system having a compressor unit for vehicle height control to suppress the transmission of vibration from a vibration source such as a compressor to a mounting part such as a vehicle body where the compressor unit is secured.

2. Description of Related Art

Among automotive suspension systems are air-suspension systems capable of performing vehicle height control by supplying and exhausting compressed air to and from an air spring by using a compressor. An air-suspension system is provided with a vibration damper so that vibration of the compressor in operation is not transmitted to the vehicle body. A conventional vibration damper provided in an air-suspension system has rubber or a coil spring interposed between a vibration source such as a compressor and a vehicle body, thereby suppressing the transmission of vibration from the compressor or other vibration source to the vehicle body. For example, Japanese Patent Application Publication No. 2004-60524 discloses an example in which the transmission of vibration is suppressed by using rubber.

The above-described conventional vibration damper using rubber or a coil spring suffers, however, from the following problems. If soft rubber is used, vibration damping performance can be improved, but durability degrades. Therefore, rather hard rubber unavoidably needs to be used in actual practice in view of durability. Accordingly, satisfactory vibration damping performance cannot be obtained. When the vibration amplitude of the compressor becomes large at the time of starting or stopping the compressor or when the load changes, the vibration damper using soft rubber may fail to provide a satisfactory vibration damping effect. A vibration damper using a coil spring can provide high vibration damping performance and durability but cannot damp vibration on the compressor side. Therefore, a pipe, hose, electric cable, etc. that are connected to the compressor and so forth are constantly under the influence of vibration and hence likely to be deteriorated. In addition, vibration may have an adverse effect on the compressor and other equipment.

The above-described problems are common to all equipment having an on-board fluid pump such as a pump that supplies a fluid pressure to a brake system mounted on an automobile, a vacuum pump that supplies a negative pressure to a booster used in a brake system, or a hydraulic pump that supplies a fluid pressure to a power steering system.

SUMMARY OF THE INVENTION

The present invention has been made in view of the above-described circumstances. Accordingly, an object of the present invention is to provide a vibration damper, isolator or absorber exhibiting high vibration damping, isolating or absorbing performance and at the same time having superior durability.

The present invention provides a vibration damper interposed between a first member and a second member that are to be vibration-damped. The vibration damper includes a resilient member secured to the first member and a support member that supports between the first and second members with spring action through the resilient member. A pair of friction members are attached to the first and second members, respectively. The friction members slide relative to each other in response to vibration.

In addition, the present invention provides a vibration damper interposed between a first member and a second member that are to be vibration-damped. The vibration damper includes a tubular resilient member secured to the first member by being fitted in a mounting hole provided in the first member. A rod member is secured at one end thereof to the second member. The other end of the rod member is slidably inserted with friction inside the resilient member. A flange member is secured to the one end of the rod member. A spring is provided around the outer periphery of the rod member such that one end of the spring abuts against the resilient member and the other end of the spring abuts against the flange member to act in a direction for moving the resilient member and the flange member away from each other. A through-hole is provided in the rod member to receive a bolt.

The above and other objects, features and advantages of the present invention will become more apparent from the following description of the preferred embodiments thereof, taken in conjunction with the accompanying drawings.

DETAILED DESCRIPTION OF THE PREFERRED EMBODIMENTS

Embodiments of the present invention will be described below in detail with reference to the accompanying drawings.

Figure 1:
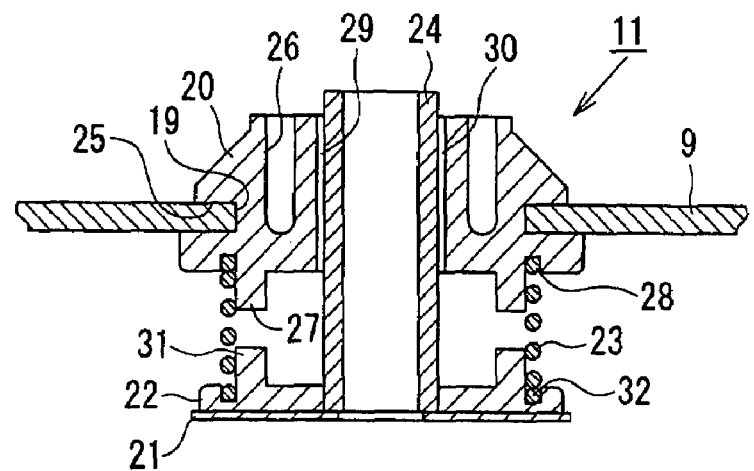
FIG. 1 is a vertical sectional view showing a vibration damper according to a first embodiment of the present invention.
Figure 2:
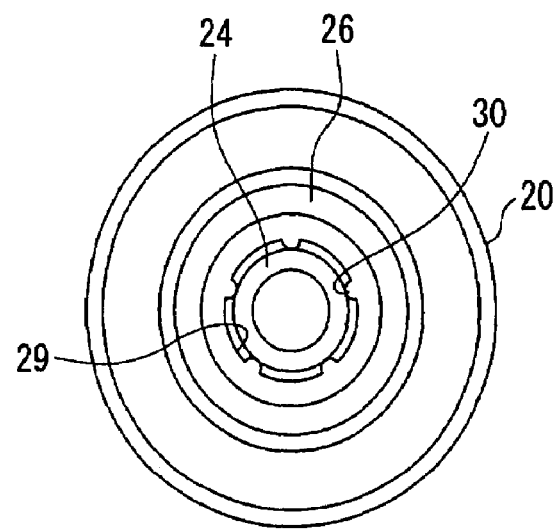
FIG. 2 is a plan view of the vibration damper shown in FIG. 1.
Figure 3:
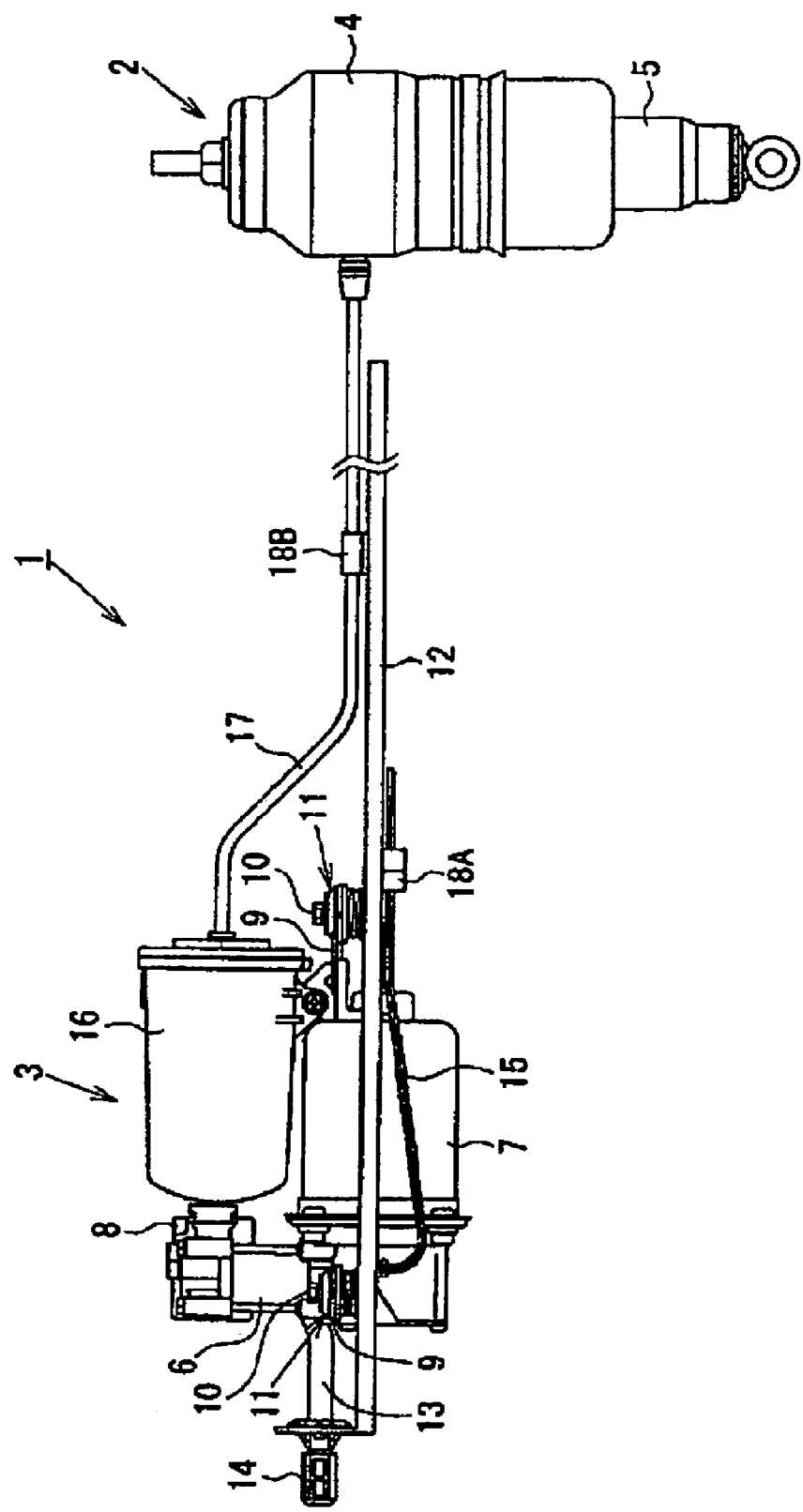
FIG. 3 is a side view showing the arrangement of an automotive air-suspension system to which the vibration damper shown in FIG. 1 is applied.

A first embodiment of the present invention will be described with reference to FIGS. 1 to 3.

An automotive air-suspension system to which a vibration damper according to this embodiment is applied will be explained with reference to FIG. 3. As shown in FIG. 3, an air-suspension system 1 has an air suspension 2 interposed between a sprung member and an unsprung member, i.e. between the vehicle body and a suspension member that supports a wheel, and a compressor unit 3 (first member) for supplying and exhausting compressed air to and from the air suspension 2.

The air suspension 2 comprises an air spring 4 and a shock absorber 5 that are integrated into one unit. The air spring 4 is a suspension spring that supports the vehicle body by the spring force thereof. The air spring 4 is supplied with and exhausted of compressed air by the compressor unit 3, thereby allowing vehicle height control to be effected. The shock absorber 5 damps vibration between the sprung and unsprung members.

The compressor unit 3 has a compressor 6, a motor 7 that drives the compressor 6, an air dryer 16 connected to the discharge port of the compressor 6 to absorb water in compressed air, and a supply and exhaust control valve 8 that controls the supply and exhaust of compressed air to and from the air spring 4. These constituent members of the compressor unit 3 are integrally connected together as one unit. The compressor unit 3 has three brackets 9 secured thereto. The brackets 9 are connected to a panel member 12 (second member), which is a vehicle body-side member, with bolts 10 through vibration dampers 11, respectively.

It should be noted that the connection effected by the bolts 10 may be implemented either by providing internal threads in the panel member 12 for screw thread engagement or by using nuts.

The suction port of the compressor 6 is connected through a flexible suction tube 13 to a suction filter 14 attached to the panel member 12. The motor 7 is connected with a lead wire 15 for power supply. The lead wire 15 is clamped to the panel member 12 with a clamp 18A. The air dryer 16 is connected to the air spring 4 of the air suspension 2 through a flexible air line 17. The air line 17 is clamped to the panel member 12 with a clamp 18B.

Next, the vibration damper 11 will be explained with reference mainly to FIGS. 1 and 2. As shown in FIGS. 1 and 2, the vibration damper 11 has an upper bush 20 (resilient member) fitted in a mounting hole 19 of the bracket 9, a lower bush 22 abutting against the panel member 12 through a washer 21 (flange member), a coil spring 23 (support member) interposed between the upper bush 20 and the lower bush 22, and a pipe member 24 (second member-side friction member, or rod member) abutting against the washer 21 and secured to the panel member 12 with the bolt 10.

The interior of the pipe member 24 forms a through-hole as a constituent element of the present invention. The bolt 10 is inserted into the through-hole. It is desirable to provide a large-diameter washer 36 stated in a second embodiment (described later) on the head side of the bolt 10. With the washer 36, the moving range of the upper bush 20 can be controlled.

The pipe member 24 may be secured to the washer 21 by welding or the like.

The upper bush 20 is an annular member made of a soft resilient material such as a rubber or synthetic resin material. The upper bush 20 has an outer peripheral groove 25 formed around the outer periphery thereof. The outer peripheral groove 25 is fitted to the peripheral edge of the mounting hole 19 of the bracket 9. The upper bush 20 is tapered at the upper end thereof and has an annular groove 26 (cavity) in the upper end surface thereof. The bottom of the annular groove 26 is located near the bottom of the outer peripheral groove 25. The portion of the upper bush 20 below the lower end of the outer peripheral groove 25 has a larger diameter than that of the tapered upper end portion of the upper bush 20. A cylindrical projection 27 (regulating portion) projects from the lower end surface of the lower end portion of the upper bush 20. An annular spring retaining groove 28 is formed on the outer periphery of the projection 27 to fit therein the upper end of the coil spring 23.

A plurality of axially extending raised portions 30 (first member-side friction member) are formed on the inner peripheral surface of an opening 29 provided in the upper bush 20. The raised portions 30 are pressed against the pipe member 24 inserted in the opening 29 to apply frictional force to sliding movement of the pipe member 24. The raised portions 30 are provided at least 3 positions, preferably at an odd number of equally spaced positions, on the inner peripheral surface of the opening 29, thereby enabling the pipe member 24 to be stably supported. In the illustrated example, the raised portions 30 are provided at 5 equally spaced positions.

The lower bush 22 is an annular member made of a soft resilient material such as a rubber or synthetic resin material in the same way as the upper bush 20. The lower bush 22 has a cylindrical projection 31 projecting from the upper end surface thereof to face the projection 27 of the upper bush 20. An annular spring retaining groove 32 is formed on the outer peripheral surface of the projection 31 to fit therein the lower end of the coil spring 23.

The upper bush 20 is fitted into the mounting hole 19 of the bracket 9, and the lower bush 22 is abutted against the panel member 12 through the washer 21. The upper end of the coil spring 23 is fitted into the spring retaining groove 28 of the upper bush 20, and the lower end thereof is fitted into the spring retaining groove 32 of the lower bush 22. The pipe member 24 is inserted through the upper bush 20 and the lower bush 22, and one end of the pipe member 24 is abutted against the washer 21. In this state, the bolt 10 is inserted through the pipe member 24 and screwed into the panel member 12, whereby the compressor unit 3 is secured to the panel member 12. At this time, usually, a gap is formed between the projection 27 of the upper bush 20 and the projection 31 of the lower bush 22, and the pipe member 24 projects from the upper end surface of the upper bush 20 to form a gap between the head of the bolt 10 and the upper end surface of the upper bush 20, thereby allowing the upper bush 20 to move between the lower bush 22 and the head of the bolt 10. Thus, the compressor unit 3 is resiliently supported floatingly by the coil spring 23.

The operation of the embodiment arranged as stated above will be explained below.

The vehicle height can be raised by setting the supply and exhaust control valve 8 in a supply position and activating the compressor 6 with the motor 7 to supply compressed air to the air spring 4 of the air suspension 2 through the air dryer 16 and the air line 17. The vehicle height can be kept constant by stopping the motor 7 and closing the supply and exhaust control valve 8 to close the air spring 4. The vehicle height can be lowered by switching the supply and exhaust control valve 8 to an exhaust position and thereby exhausting compressed air from the air spring 4.

Normally, the vibration damper 11 resiliently and floatingly supports the compressor unit 3 by the coil spring 23 and suppresses the transmission of vibration from the compressor unit 3 to the panel member 12 by the resilience of the coil spring 23 and the upper and lower bushes 20 and 22. At this time, the vibration can be damped by the friction generated by the sliding contact between the pipe member 24 and the raised portions 30 of the upper bush 20. Thus, vibration is suppressed and damped by the resilience of the coil spring 23 and the friction between the pipe member 24 and the raised portions 30, thereby enabling vibration damping, isolating or absorbing performance to be improved while maintaining the durability of the upper and lower bushes 20 and 22. Accordingly, it is possible to achieve improvements in both vibration damping performance and durability. In addition, because the vibration of the compressor unit 3 can be damped, deterioration of the suction tube 13, the lead wire 15 and the air line 17 due to vibration can be reduced, and durability of these components can be improved.

When a rotational force is generated at the time of starting the motor 7 or on other occasion, the bracket 9 swings. The swing motion of the bracket 9 can be absorbed by elastic deformation of the upper bush 20. In this embodiment, in particular, the annular groove 26 provided in the upper bush 20 improves the swingability about the axis of the inner peripheral portion of the upper bush 20 to absorb the swing motion of the bracket 9 even more effectively. Further, when the bracket 9 swings, a thrust force is generated between the upper bush 20 and the pipe member 24. However, the pipe member 24 is in contact with the raised portions 30, and reliefs are present at both sides of each raised portion 30. Therefore, the friction can be prevented from becoming excessively high.

When the vibration amplitude of the compressor unit 3 becomes excessively large at the time of starting or stopping the motor 7 and the compressor 6 or when the load changes, the respective projections 27 and 31 of the upper and lower bushes 20 and 22, which are resilient members, collide with each other, thereby enabling the vibration to be suppressed by the resilience of the upper bush 20 while absorbing impact.

The friction (damping force) between the pipe member 24 and the raised portions 30 can be adjusted by changing the number and configuration of the raised portions 30 and the diameter of the pipe member 24, etc. Therefore, the vibration damping characteristics of the vibration damper 11 can be readily adjusted according to need.

Although in the above-described embodiment the first member and the second member in the present invention are the compressor unit 3 and the panel member 12, respectively, the present invention is not necessarily limited thereto. The compressor unit 3 may be the second member, and the panel member 12 may be the first member. In this case, the vibration dampers 11 are installed inversely to the above.

Although in the foregoing embodiment the lower bush 22 is a resilient member, by way of example, it may be a rigid member.

Next, a second embodiment of the present invention will be described with reference to FIGS. 4 to 7. It should be noted that in the second embodiment the same members or portions as those in the first embodiment are denoted by the same reference numerals as in the first embodiment, and only portions in which the second embodiment differs from the first embodiment will be explained in detail.

Figure 4:
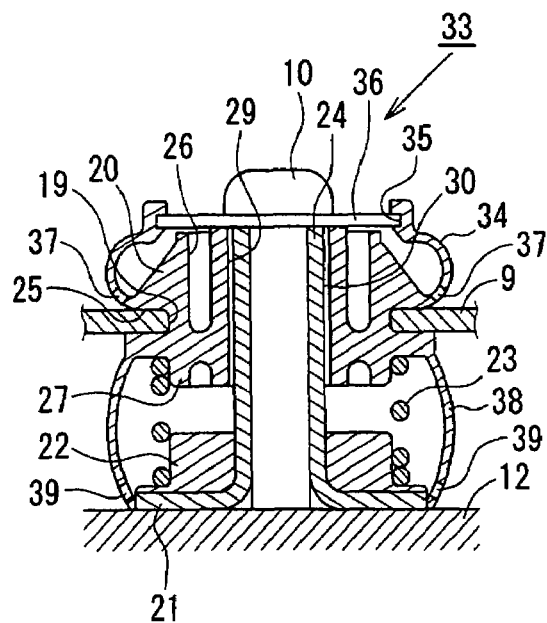
FIG. 4 is a vertical sectional view showing a vibration damper according to a second embodiment of the present invention.

As shown in FIG. 4, in a vibration damper 33 according to the second embodiment, a portion of the upper bush 20 above the outer peripheral groove 25 is extended upward in a tubular shape, whereby a thin-walled upper cover 34 (cover) is integrally formed so as to cover the tapered portion of the upper bush 20. The upper end portion of the upper cover 34 is formed with an inner peripheral groove 35. The inner peripheral groove 35 is fitted with the outer peripheral portion of a washer 36 secured to the upper end of the pipe member 24 with the bolt 10, thereby connecting the upper cover 34 to the washer 36. The upper cover 34 is flexible and curved to bulge radially outward, thereby allowing the upper bush 20 to slide along the pipe member 24. The lower end portion of the upper cover 34 is provided with a plurality of holes 37 to drain water entering the inside of the upper cover 34.

A portion of the upper bush 20 below the outer peripheral groove 25 is extended downward in a tubular shape, whereby a thin-walled lower cover 38 (cover) is integrally formed so as to cover the pipe member 24 and the lower bush 22. The lower end portion of the lower cover 38 is fitted to the outer periphery of the washer 21 integrally formed at the lower end of the pipe member 24, and thus the lower cover 38 is connected to the washer 21. The lower cover 38 is flexible and curved to bulge radially outward, thereby allowing the upper bush 20 to slide along the pipe member 24. The lower end portion of the lower cover 38 is provided with a plurality of drain holes 39 (communicating openings) to drain water entering the inside of the lower cover 38.

It should be noted that in the vibration damper 33 of this embodiment the washer 21 is integrally formed at the lower end of the pipe member 24, and the lower bush 22 is secured to the pipe member 24 and the washer 21.

With the above-described structure, the area of sliding contact between the upper bush 20 and the pipe member 24 is covered with the upper cover 34 and the lower cover 38. Thus, it is possible to prevent entry of contamination into the sliding contact area and hence possible to prevent variation of sliding friction due to contamination. In addition, the deterioration of the sliding contact area due to contamination can be prevented to improve durability.

Next, modifications of the second embodiment will be described with reference to FIGS. 5 to 7. It should be noted that in the modifications the same members or portions as those of the second embodiment shown in FIG. 4 are denoted by the same reference numerals as those in FIG. 4, and only portions in which the modifications differ from the second embodiment will be explained in detail.

Figure 5:
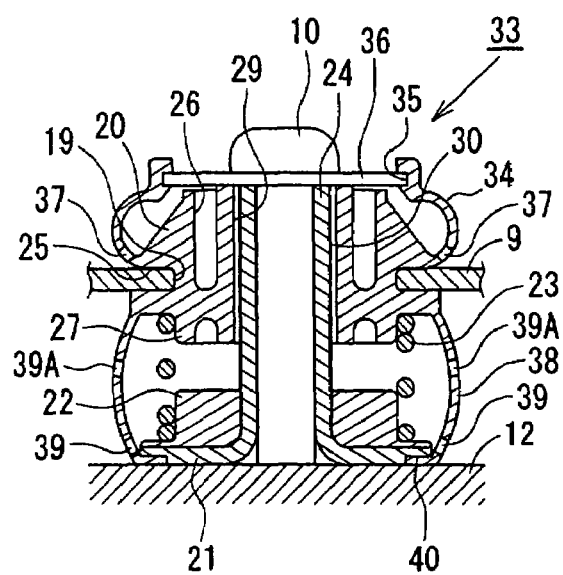
FIG. 5 is a vertical sectional view showing a modification of the vibration damper shown in FIG. 4.

In the modification shown in FIG. 5, a recess 40 is formed around the outer peripheral edge of the lower surface of the washer 21 at the lower end of the pipe member 24. The distal end portion of the lower cover 38 is fitted into the recess 40 and clamped between the washer 21 and the panel member 12. Thus, the lower cover 38 can be surely connected to the washer 21, and sealing properties can be improved.

In addition, the lower cover 38 is provided with vent holes 39A (communicating openings) above the drain holes 39 to allow breathing therethrough. It should be noted that the total passage area of the vent holes 39A is set larger than that of the drain holes 39 so that the suction of water through the drain holes 39 is prevented as much as possible.

Figure 6:
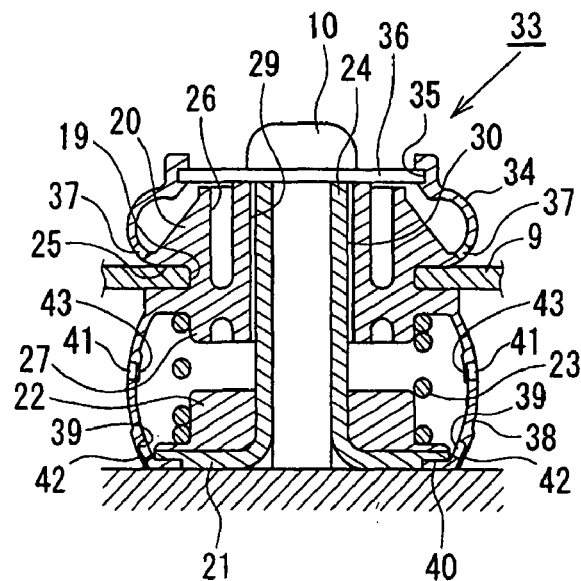
FIG. 6 is a vertical sectional view showing another modification of the vibration damper shown in FIG. 4.

In the modification shown in FIG. 6, a plurality of vent holes 41 (communicating openings) are provided in the upper portion of the lower cover 38 in place of the vent holes 39A, in addition to the structure of the modification shown in FIG. 5. Further, check valves 42 and 43 are provided for the drain holes 39 and the vent holes 41, respectively. Each check valve 42 for a drain hole 39 comprises a lip portion integrally formed with the lower cover 38 so that it abuts against the outer side of the wall portion of the lower cover 38 to selectively open or close the drain hole 39. The check valves 42 allow only flow from the inside to the outside of the lower cover 38. Each check valve 43 for a vent hole 41 comprises a lip portion integrally formed with the lower cover 38 so that it abuts against the inner side of the wall portion of the lower cover 38 to selectively open or close the vent hole 41. The check valves 43 allow only flow from the outside to the inside of the lower cover 38.

With the above-described structure, when the upper bush 20 moves along the pipe member 24, the interior volume of the lower cover 38 changes, causing air to be sucked in from the vent holes 41 and discharged from the drain holes 39. Thus, air can be circulated between the inside and outside of the lower cover 38 to ventilate the interior of the lower cover 38, and dew condensation and the like can be prevented. It should be noted that the upper cover 34 may be provided with vent holes and check valves in the same way as the above.

Figure 7:
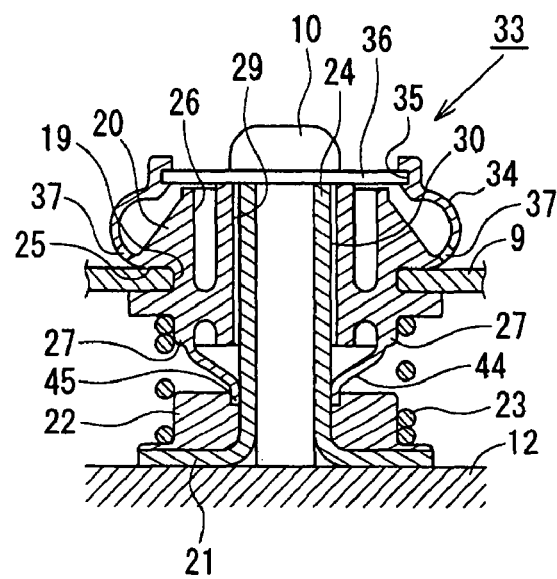
FIG. 7 is a vertical sectional view showing still another modification of the vibration damper shown in FIG. 4.

In the modification shown in FIG. 7, the lower end outer peripheral portion of the projection 27 of the upper bush 20 that is positioned at the inner peripheral side of the coil spring 23 is extended downward, whereby a thin-walled lower cover 44 is integrally formed so as to cover the pipe member 24. The lower end portion of the lower cover 44 is fitted into an annular groove 45 formed between the upper end inner peripheral edge of the lower bush 22 and the outer peripheral portion of the pipe member 24, thereby being connected to the lower bush 22. The lower cover 44 is tapered and flexible, thereby allowing the upper bush 20 to slide along the pipe member 24. The lower end portion of the lower cover 44 is provided with a plurality of drain holes (not shown) to drain water entering the inside of the lower cover 44. The lower cover 44 may be provided with vent holes and check valves as in the case of the modification shown in FIG. 6. With this structure, it is possible to offer the same operation and advantageous effects as those in the modifications shown in FIGS. 4 to 6.

Figure 8:
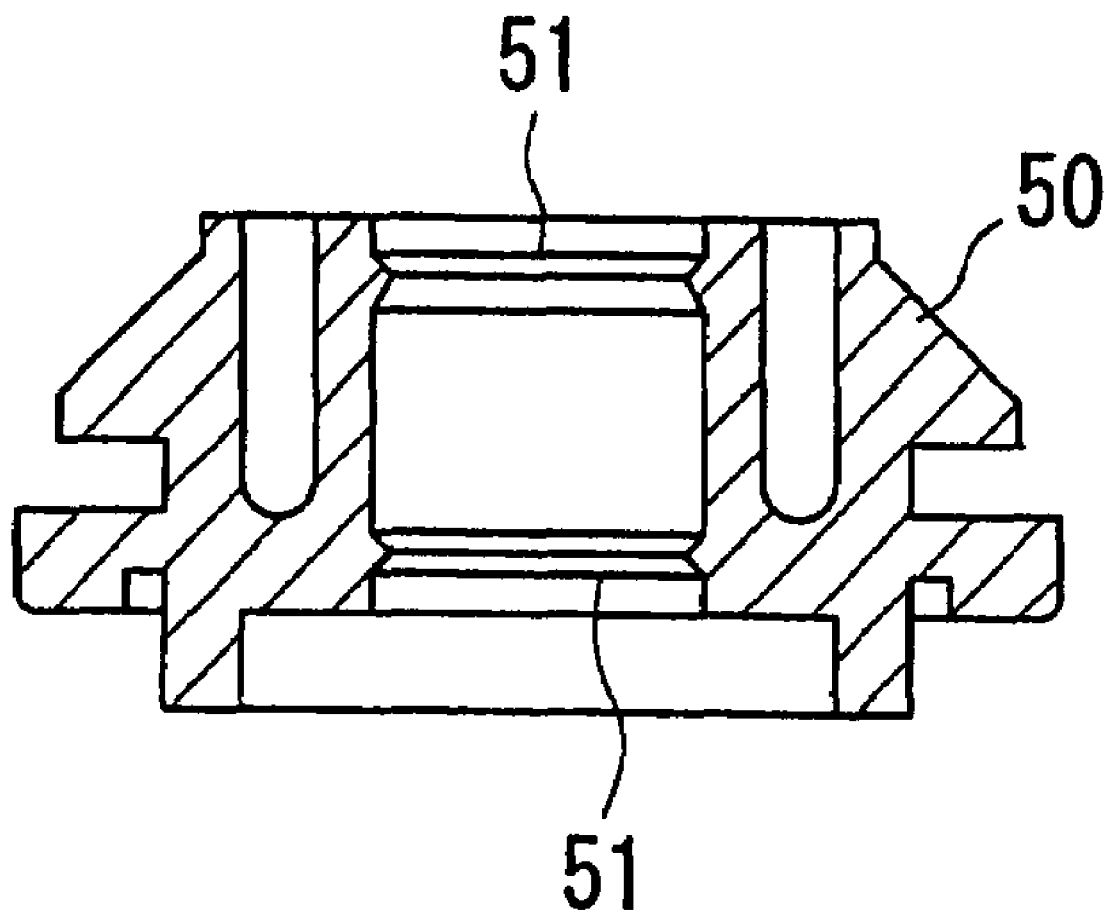
FIG. 8 is a vertical sectional view showing a modification of an upper bush of the first embodiment shown in FIG. 1.

FIG. 8 shows a modification in which the axially extending raised portions 30 (first member-side friction member) formed on the inner peripheral surface of the opening 29 of the upper bush 20 in the first embodiment are replaced with two circumferentially extending raised portions 51. The raised portions 51 provided in the upper bush 50 each have a lip-shaped distal end portion extending upward as viewed in the figure. By varying the lip configuration of the raised portions 51, frictional force can be varied between when the first member and the second member move toward each other and when they move away from each other. It should be noted that although the circumferential raised portions 51 are circular, they may be spiral. If the raised portions 51 are formed in a spiral configuration, the advantageous effects of both this modification and the first embodiment can be obtained. In addition, the upper bush can be readily removed from the mold in production.

Although in the foregoing embodiments the inner peripheral surface of the upper bush is directly used as a friction member, another member may be bonded to the inner peripheral surface of the upper bush to serve as a friction member. The arrangement may also be such that the inner peripheral surface of the upper bush is formed as a flat surface, and an uneven configuration is provided on the outer periphery of the pipe member 24 as a rod member.

Further, in the foregoing embodiments the coil spring 23 is used as the support member of the present invention. The support member is, however, not necessarily limited to the coil spring 23 but may be anything that has spring properties, such as a cylindrical elastomer, disc spring (or Belleville spring) or air spring. However, the coil spring is the most favorable because it provides a soft spring force and has durability.

Although in the foregoing embodiments the vibration damper of the present invention is used in a compressor unit for an air suspension, the application of the present invention is not necessarily limited thereto. The vibration damper of the present invention may also be used in equipment having an on-board fluid pump, such as a pump unit that supplies a fluid pressure to a brake system mounted on an automobile, a vacuum pump unit that supplies a negative pressure to a booster used in a brake system, or a hydraulic pump unit that supplies a fluid pressure to a power steering system.

According to the vibration dampers of the foregoing embodiments, the first and second members are resiliently supported by a support member, thereby allowing vibration to be absorbed. In addition, vibration can be damped by friction generated by sliding contact between a pair of friction members. Further, the resilient member can exhibit a vibration damping effect also on vibration occurring in a direction other than the axial direction.

According to the vibration dampers of the foregoing embodiments, the resilient member has an annular shape. The friction member of the first member is formed by the inner peripheral portion of the resilient member, and the friction member of the second member is a rod member slidably inserted into the inner peripheral portion of the resilient member and secured to the second member. Accordingly, the resilient member also serves as a friction member. Thus, the vibration damper can be reduced in cost and simplified in structure.

According to the vibration dampers of some of the foregoing embodiments, a plurality of axially extending raised portions are formed on the inner periphery of the resilient member so as to be in abutment against the rod member. Accordingly, a desired level of friction can be set by the configuration of the raised portions. Further, even if force in the swing direction acts on the resilient member, the friction can be prevented from becoming excessively high because a relief is present between each pair of adjacent raised portions.

According to the vibration damper of one of the foregoing embodiments, a plurality of circumferentially extending raised portions are formed on the inner periphery of the resilient member so as to be in abutment against the rod member. Accordingly, a desired level of friction can be set by the configuration of the raised portions. Further, frictional force can be variably set according to the axial travel direction of the resilient member.

According to the vibration dampers of the foregoing embodiments, the resilient member is provided with a regulating portion that abuts against the second member to regulate relative movement between the first member and the second member. Accordingly, when the vibration amplitude is large, the resilient member abuts against the second member, thereby preventing the transmission of excessive vibration. After the resilient member has abutted against the second member, the vibration can be suppressed by the resilience of the resilient member.

According to the vibration dampers of the foregoing embodiments, a cavity is provided around the inner peripheral portion of the resilient member to improve swingability about the axis of the inner peripheral portion. Accordingly, even if force in the swing direction acts on the resilient member, the swing can be effectively absorbed by the cavity around the inner peripheral portion.

According to the vibration dampers of some of the foregoing embodiments, a cover is provided to cover the area of sliding contact between the pair of friction members. Accordingly, entry of contamination into the sliding contact area between the friction members can be prevented by the cover, and it is possible to prevent variation of the sliding friction due to contamination. In addition, the deterioration of the sliding contact area due to contamination can be prevented to improve durability.

According to the vibration dampers of some of the foregoing embodiments, the cover is integrated with the resilient member, whereby the number of parts can be reduced.

According to the vibration dampers of some of the foregoing embodiments, the cover is provided with a communicating opening. Accordingly, it is possible to drain water entering the inside of the cover.

According to the vibration dampers of some of the foregoing embodiments, at least two communicating openings are provided in the cover. One of the communicating openings is provided with a check valve that allows only flow from the inside of the cover to the outside thereof. Another of the at least two communicating openings is provided with a check valve that allows only flow from the outside of the cover to the inside thereof. Accordingly, water entering the inside of the cover can be drain from a communicating opening at the lower end of the cover, and air can be sucked in through a communicating opening above the first-mentioned communicating opening. Thus, it is possible to prevent drained water from being sucked in again immediately after it has been discharged.

According to the vibration dampers of some of the foregoing embodiments, at least two communicating openings are provided in the cover. One of the communicating openings is provided closer to the lower end of the cover as viewed in the installed position of the vibration damper. Another of the at least two communicating openings is provided above the communicating opening provided closer to the lower end of the cover. Accordingly, air can be circulated between the inside and outside of the cover to ventilate the inside of the cover.

According to the vibration dampers of some of the foregoing embodiments, the rod member is provided with an axially extending through-hole for receiving a bolt to secure the rod member to the second member. Accordingly, a single rod member can function both as a friction member on the second member side and as a member for mounting itself. Thus, the number of parts can be reduced, and miniaturization can be achieved.

According to the vibration dampers of the foregoing embodiments, the first and second members are resiliently supported by a spring, thereby allowing vibration to be absorbed. In addition, vibration can be damped by friction generated by sliding contact between a pair of friction members. Further, the resilient member can exhibit a vibration damping effect also on vibration occurring in a direction other than the axial direction of the spring.

According to the vibration dampers of some of the foregoing embodiments, the first member is a bracket for mounting an on-board fluid pump, and the second member is a body of an automobile. Accordingly, the transmission of vibration to the automobile body can be prevented, Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Applications Nos. 2006-126112 filed on Apr. 28, 2006 and 2006-268742 filed on Sep. 29, 2006 including specification, claims, drawings and summary is incorporated herein by reference in its entirety.

What is claimed is:

1. A vibration damper interposed between a first member and a second member that are to be vibration-damped, the vibration damper comprising:
    a resilient member secured to the first member;
    a support member that supports between the first member and second member with spring action through the resilient member;
    a first fiction member attached to the first member; and
    a second friction member attached to the second member, the first and second friction members being adapted to slide against each other in response to vibration,
    wherein the resilient member has an annular shape, and the first friction member forms an inner peripheral portion of the resilient member,
    wherein the second friction member is a rod member that is slidably inserted into the inner peripheral portion of the resilient member and is secured to the second member, and
    wherein the resilient member has a plurality of axially extending raised portions formed on the inner peripheral portion thereof, the raised portions being in abutment against the rod member.

2. A vibration damper according to claim 1, wherein the resilient member has a regulating portion projecting therefrom toward the second member, and the regulating portion abuts against a projection projecting from a member mounted on the second member to regulate relative movement between the first member and the second member.

3. A vibration damper according to claim 1, wherein a cavity is provided in the resilient member around the inner peripheral portion thereof to improve swingability about an axis of the inner peripheral portion.

4. A vibration damper according to claim 1, wherein a cover is provided to cover sliding portions of the first and second friction members.

5. A vibration damper according to claim 4, wherein the cover is integrally formed with the resilient member.

6. A vibration damper according to claim 4, wherein the cover is provided with a communicating opening.

7. A vibration damper according to claim 4, further including at least two communicating openings, one of the at least two communicating openings being provided with a check valve that allows only flow from an inside of the cover to an outside thereof, and another of the at least two communicating openings being provided with a check valve that allows only flow from the outside of the cover to the inside thereof.

8. A vibration damper according to claim 4, further including at least two communicating openings, one of the at least two communicating openings being provided closer to a lower end of the cover as viewed in an installed position of the vibration damper, and another of the at least two communicating openings being provided above the communicating opening provided closer to the lower end of the cover.

9. A vibration damper according to claim 1, wherein the rod member is provided with an axially extending through-hole for receiving a bolt to secure the rod member to the second member.

10. A vibration damper according to claim 1, wherein the first member is a bracket for mounting an on-board fluid pump, and the second member is a body of an automobile.

11. A vibration damper interposed between a first member and a second member that are to be vibration-damped, the vibration damper comprising:
    a tubular resilient member secured to the first member by being fitted in a mounting hole provided in the first member;
    a rod member secured at one end thereof to the second member, the other end of the rod member being slidably inserted with friction inside the resilient member;
    a flange member secured to the one end of the rod member;
    a spring provided around an outer periphery of the rod member such that one end of the spring abuts against the resilient member and the other end of the spring bears against the flange member to act in a direction for moving the resilient member and the flange member away from each other; and
    a through-hole provided in the rod member to receive a bolt.

12. A vibration damper according to claim 11, wherein the first member is a bracket for mounting an on-board fluid pump, and the second member is a body of an automobile.

13. A vibration damper for damping vibrations between a first member and a second member, the vibration damper comprising:

a first bush adapted to be secured to the first member, the first bush being formed of a resilient material and configured to permit connection to the first member;

a second bush adapted to be supported on the second member, wherein the first bush and the second bush are normally spaced from each other;

an elastic member disposed between the first bush and the second bush to bias the first bush and the second bush away from each other;

a hollow pipe member slidably inserted through the first bush and connected to the second bush, wherein the hollow pipe member defines a through hole for receiving a fastening member for securing the hollow pipe member to the second member; and friction means for creating friction between an inner peripheral surface of the first bush and an outer peripheral surface of the hollow pipe member to resist sliding movement of the hollow pipe member relative to the first bush.

14. A vibration damper according to claim 13, wherein the friction means comprises a plurality of axially extending raised portions formed on the inner peripheral surface of the first bush and engaging the outer peripheral surface of the hollow pipe member.

15. A vibration damper according to claim 14, wherein the second bush comprises an annular member formed of resilient material.

16. A vibration damper according to claim 15, wherein the first bush includes a first projection extending toward the second bush, and the second bush includes a second projection that extends toward the first bush and opposes the first projection, wherein the first and second projections regulate relative movement of the first bush and the second bush by abutting against each other when the first or second member is subjected to excessive vibration.

17. A vibration damper according to claim 16, wherein the first bush includes a cavity for absorbing swinging motion of the first member, the cavity being located about an axis of the pipe member.

* * * * *